US012464335B2

(12) United States Patent
Chen

(10) Patent No.: US 12,464,335 B2
(45) Date of Patent: Nov. 4, 2025

(54) APPARATUS AND METHOD OF WIRELESS COMMUNICATION

(71) Applicant: Purplevine Innovation Company Limited, Hong Kong (CN)

(72) Inventor: Chiu-Wen Chen, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 409 days.

(21) Appl. No.: 17/950,204

(22) Filed: Sep. 22, 2022

(65) Prior Publication Data

US 2023/0015209 A1 Jan. 19, 2023

Related U.S. Application Data

(63) Continuation of application No. PCT/CN2021/093902, filed on May 14, 2021.

(60) Provisional application No. 63/025,414, filed on May 15, 2020.

(51) Int. Cl.
*H04W 8/18* (2009.01)
*H04W 36/00* (2009.01)
*H04W 48/16* (2009.01)
*H04W 74/0833* (2024.01)
*H04W 76/20* (2018.01)
*H04W 76/27* (2018.01)
*H04W 84/04* (2009.01)

(52) U.S. Cl.
CPC ....... *H04W 8/183* (2013.01); *H04W 36/0016* (2013.01); *H04W 48/16* (2013.01); *H04W 74/0841* (2013.01); *H04W 76/20* (2018.02); *H04W 76/27* (2018.02); *H04W 84/042* (2013.01)

(58) Field of Classification Search
CPC .... H04W 48/16; H04W 76/20; H04W 84/042
See application file for complete search history.

(56) References Cited

U.S. PATENT DOCUMENTS

| 2021/0112412 | A1 | 4/2021 | Ke |
| 2021/0345226 | A1 | 11/2021 | Liao et al. |
| 2023/0180148 | A1* | 6/2023 | Kung ................. H04W 52/365 |
| | | | 370/318 |

FOREIGN PATENT DOCUMENTS

| CN | 110636506 | 12/2019 |
| WO | WO 2020/072657 | 4/2020 |

OTHER PUBLICATIONS

International Search Report and the Written Opinion Dated Jul. 29, 2021 From the International Searching Authority Re. Application No. PCT/CN2021/093902. (6 Pages).

(Continued)

*Primary Examiner* — Diane D Mizrahi

(57) ABSTRACT

A wireless communication method for onboarding and provisioning in non-public networks (NPN) is disclosed, wherein a first next-generation radio access network (NG-RAN) transmits NPN-related information to a user equipment (UE). The method introduces mechanisms for NPN cell identification, synchronization sequences, and system information broadcasting, enabling NPN access and provisioning. Improvements include the transmission of synchronization sequences on initial bandwidth parts (BWP), integration of NPN access permissions in system information elements (IEs), and/or enhanced system information delivery on downlink BWPs for NPN access.

33 Claims, 12 Drawing Sheets

(56) References Cited

OTHER PUBLICATIONS

Sony, "Cell Selection/Reselection With NPN Cells", Sony, 3GPP TSG RAN WG2 Meeting #107bis, Chongqing, China, Oct. 14-18, 2019, R2-1913363, 3 P., Oct. 18, 2019.
Nokia, "Finalization of the Support of Non-Public Networks", Nokia (Rapporteur), 3GPP TSG-RAN WG2 Meeting #109bis-e, Electronic, Apr. 20-30, 2020, R2-2002658, 27 P., Apr. 30, 2020.
Samsung, "(TP for NPN BL CR for 38.423) RRC Resumption or Reestablishment Impact in NPN", Samsung, 3GPP TSG-RAN WG3 #107-e, E-Meeting, Feb. 24-Mar. 6, 2020, R3-200514, 11 P., Mar. 6, 2020.

* cited by examiner

APPARATUS AND METHOD OF WIRELESS COMMUNICATION

CROSS REFERENCE TO RELATED APPLICATIONS

This application is a Continuation of PCT Patent Application No. PCT/CN2021/093902 having International filing date of May 14, 2021, which claims the benefit of priority of U.S. Provisional Patent Application No. 63/025,414, filed on May 15, 2020. The contents of all of the above applications are incorporated by reference as if fully set forth herein.

FIELD AND BACKGROUND OF THE INVENTION

The present disclosure relates to the field of communication systems, and more particularly, to an apparatus and a method of wireless communication, such as cell identification in non-public networks, which can provide a good communication performance and/or high reliability.

5G networks are expected to provide high speed, low latency, and ultra-reliable communication capabilities and fulfil requirements from different industries and users. To fulfil low latency and high reliability requirements for the vertical industry as well as support 5G local area network (LAN)-type service, a dedicated wireless network, i.e., non-public network, attracts attention. 5G non-public networks take industrial internet of things (IIoT) and ultra-reliable low-latency communication (URLLC) to the next level. To implement these non-public network functions on a radio access network (RAN) side, features, such as network identification, selection and/or reselection, and access control are supported.

When a user equipment (UE) performs attachment to a non-public network, the UE can indicate a selected non-public network identifier and a corresponding public land mobile network identifier (PLMN ID) to a next generation radio access network (NG-RAN). The NG-RAN can forward a received selected non-public network identifier to an access and mobility management function (AMF) for service-based subscription verification. Hereafter, the AMF notifies a verification result to the NG-RAN. That is, before the UE reports the selected non-public network identifier and the AMF notifies the verification result to the NG-RAN, the NG-RAN has no idea whether the UE is a non-public network subscriber or a normal PLMN subscriber. The NG-RAN may wait for the verification result while a connection is established. The NG-RAN does not know when and which neighboring cells are suitable to configure for the UE. A blind measurement may waste UE's power, if the neighboring cells belong to the non-public network are far away or even there is no cell supporting non-public network around the UE. If the NG-RAN configures a measurement configuration without a non-public network information, an unsuitable measurement configuration may take longer cell (re)selection time and increase a rate of connection failure (e.g., handover, connection resumption, dual connectivity establishment, etc.).

Therefore, there is a need for an apparatus and a method of wireless communication of the same, which can solve issues in the prior art, provide an access stratum (AS) level cell/subscription identification, provide an efficient UE's mobility restriction exchange, provide a lower power consumption, provide a better resource management, provide a service continuity due to mobility, provide lower latency for non-public network membership identification, provide higher reliability for non-public network connection, and/or provide a good communication performance.

SUMMARY OF THE INVENTION

An object of the present disclosure is to propose an apparatus and a method of wireless communication of the same, which can solve issues in the prior art, provide an access stratum (AS) level cell/subscription identification, provide an efficient UE's mobility restriction exchange, provide a lower power consumption, provide a better resource management, provide a service continuity due to mobility, provide lower latency for non-public network membership identification, provide higher reliability for non-public network connection, and/or provide a good communication performance.

In a first aspect of the present disclosure, a method of wireless communication by a first next generation radio access network (NG-RAN) comprises performing, by the first NG-RAN, a non-public network (NPN) cell identification on an access stratum (AS) level for downlink (DL), wherein performing, by the first NG-RAN, the NPN cell identification on the AS level for DL comprises at least one of the followings: wherein a synchronization sequence for NPN can be transmitted in one or more synchronization signal blocks (SSBs) on an initial bandwidth part (BWP) by an NPN cell, wherein in a broadcasting system information on a DL BWP, an NPN identifier (ID) is present in an NPN access related information information element (IE), wherein a pre-configured DL BWP for NPN is used to transmit an SSB and related system information, or wherein an access class permission is transmitted in system information on the DL BWP for NPN access allowance.

In a second aspect of the present disclosure, a method of wireless communication by a user equipment (UE) comprises receiving, by the UE, a non-public network (NPN) cell identification on an access stratum (AS) level for downlink (DL) from a base station and performing, by the UE, a non-public network (NPN) cell subscription on an access stratum (AS) level for uplink (UL), wherein performing, by the UE, the NPN cell subscription on the AS level for UL comprises at least one of the followings: wherein a preamble sequence for NPN can be transmitted in a random access channel (RACH) on a UL bandwidth part (BWP) by the UE, wherein an NPN connection cause is transmitted in a radio resource control (RRC) signalling on the UL BWP, wherein a pre-configured UL BWP for NPN is used to transmit a normal preamble sequence, or wherein an access class of NPN for the UE is stored in a subscriber identity module (SIM) or universal subscriber identity module (USIM).

In a third aspect of the present disclosure, a first next generation radio access network (NG-RAN) comprises a memory, a transceiver, and a processor coupled to the memory and the transceiver. The processor is configured to perform a non-public network (NPN) cell identification on an access stratum (AS) level for downlink (DL), wherein performing, by the first NG-RAN, the NPN cell identification on the AS level for DL comprises at least one of the followings: wherein a synchronization sequence for NPN can be transmitted in one or more synchronization signal blocks (SSBs) on an initial bandwidth part (BWP) by an NPN cell, wherein in a broadcasting system information on a DL BWP, an NPN identifier (ID) is present in an NPN access related information information element (IE), wherein the DL BWP for NPN is used to transmit an SSB and related system information, or wherein an access class permission is transmitted in system information on the DL BWP for NPN access allowance.

In a fourth aspect of the present disclosure, a user equipment (UE) comprises a memory, a transceiver, and a processor coupled to the memory and the transceiver. The transceiver is configured to receive a non-public network (NPN) cell identification on an access stratum (AS) level for downlink (DL) from a base station. The processor is configured to perform a non-public network (NPN) cell subscription on an access stratum (AS) level for uplink (UL), wherein performing, by the UE, the NPN cell subscription on the AS level for UL comprises at least one of the followings: wherein a preamble sequence for NPN can be transmitted in a random access channel (RACH) on a UL bandwidth part (BWP) by the UE, wherein an NPN connection cause is transmitted in a radio resource control (RRC) signalling on the UL BWP, wherein the UL BWP for NPN is used to transmit a normal preamble sequence, or wherein an access class of NPN for the UE is stored in a subscriber identity module (SIM) or universal subscriber identity module (USIM).

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE SEVERAL VIEWS OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DESCRIPTION OF SPECIFIC EMBODIMENTS OF THE INVENTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1A:
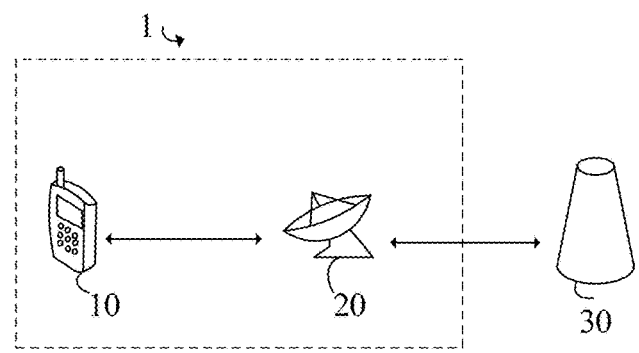
FIG. 1A is a schematic diagram illustrating a communication controlling system according to an embodiment of the present disclosure.
Figure 1B:
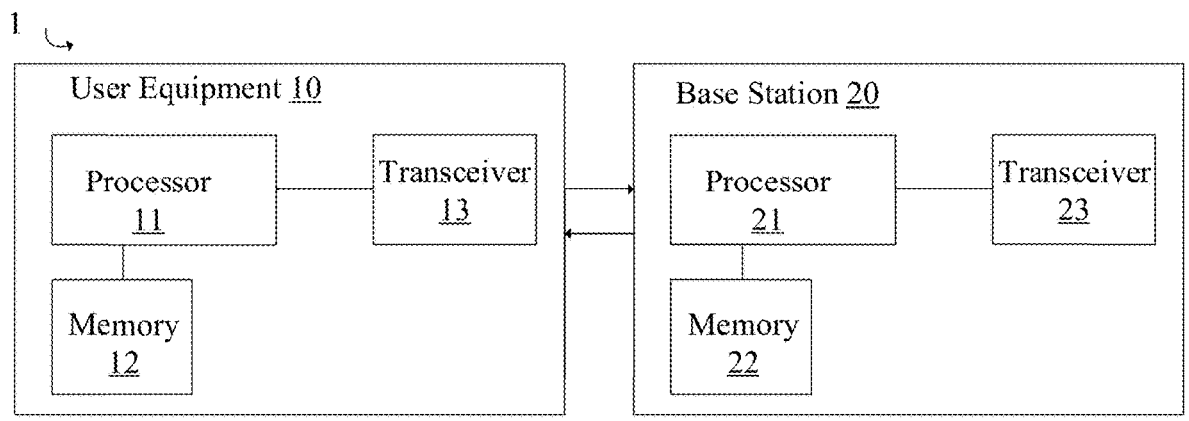
FIG. 1B is a block diagram illustrating a communication controlling system according to an embodiment of the present disclosure.

FIG. 1A and FIG. 1B illustrate that, in some embodiments, a communication controlling system 1 according to an embodiment of the present disclosure is provided. The communication controlling system 1 comprises a user equipment 10 and a base station 20. The user equipment 10 and the base station 20 may communicate with each other either wirelessly or in a wired way. The base station 20 (such as a first next generation radio access network (NG-RAN)) and a next generation core network 30 may also communicate with each other either wirelessly or in a wired way. When the communication controlling system 1 complies with a new radio (NR) standard of 3rd generation partnership project (3GPP), the next generation core network 30 is a backend serving network system and may comprise an access and mobility management function (AMF), a user plane function (UPF), and a session management function (SMF). The user equipment 10 may be a non-public network (NPN) capable apparatus or a non-NPN capable apparatus, but the present disclosure is not limited to this. The user equipment 10 comprises a processor 11, a memory 12, and a transceiver 13. The processor 11 is coupled to the memory 12 and the transceiver 13. The transceiver 13 of the user equipment 10 is configured to transmit a signal to the base station 20 so that the user equipment 10 communicates with the base station 20 each other. The base station 20 may include a processor 21, a memory 22, and a transceiver 23. The processor 21 is coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 21 is configured to perform a non-public network (NPN) cell identification on an access stratum (AS) level for downlink (DL), wherein performing, by the first NG-RAN 20, the NPN cell identification on the AS level for DL comprises at least one of the followings: wherein a synchronization sequence for NPN can be transmitted in one or more synchronization signal blocks (SSBs) on an initial bandwidth part (BWP) by an NPN cell, wherein in a broadcasting system information on a DL BWP, an NPN identifier (ID) is present in an NPN access related information information element (IE), wherein the DL BWP for NPN is used to transmit an SSB and related system information, or wherein an access class permission is transmitted in system information on the DL BWP for NPN access allowance. This can solve issues in the prior art, provide an access stratum (AS) level cell/subscription identification, provide an efficient UE's mobility restriction exchange, provide a lower power consumption, provide a better resource management, provide a service continuity due to mobility, provide lower latency for non-public network membership identification, provide higher reliability for non-public network connection, and/or provide a good communication performance.

In some embodiments, the transceiver 13 is configured to receive a non-public network (NPN) cell identification on an access stratum (AS) level for downlink (DL) from a base station, and the processor 11 is configured to perform a non-public network (NPN) cell subscription on an access stratum (AS) level for uplink (UL), wherein performing, by the UE, the NPN cell subscription on the AS level for UL comprises at least one of the followings: wherein a preamble sequence for NPN can be transmitted in a random access channel (RACH) on a UL bandwidth part (BWP) by the UE, wherein an NPN connection cause is transmitted in a radio resource control (RRC) signalling on the UL BWP, wherein the UL BWP for NPN is used to transmit a normal preamble sequence, or wherein an access class of NPN for the UE is stored in a subscriber identity module (SIM) or universal subscriber identity module (USIM). This can solve issues in the prior art, provide an access stratum (AS) level cell/subscription identification, provide an efficient UE's mobility restriction exchange, provide a lower power consumption, provide a better resource management, provide a service continuity due to mobility, provide lower latency for non-public network membership identification, provide higher reliability for non-public network connection, and/or provide a good communication performance.

Figure 2:
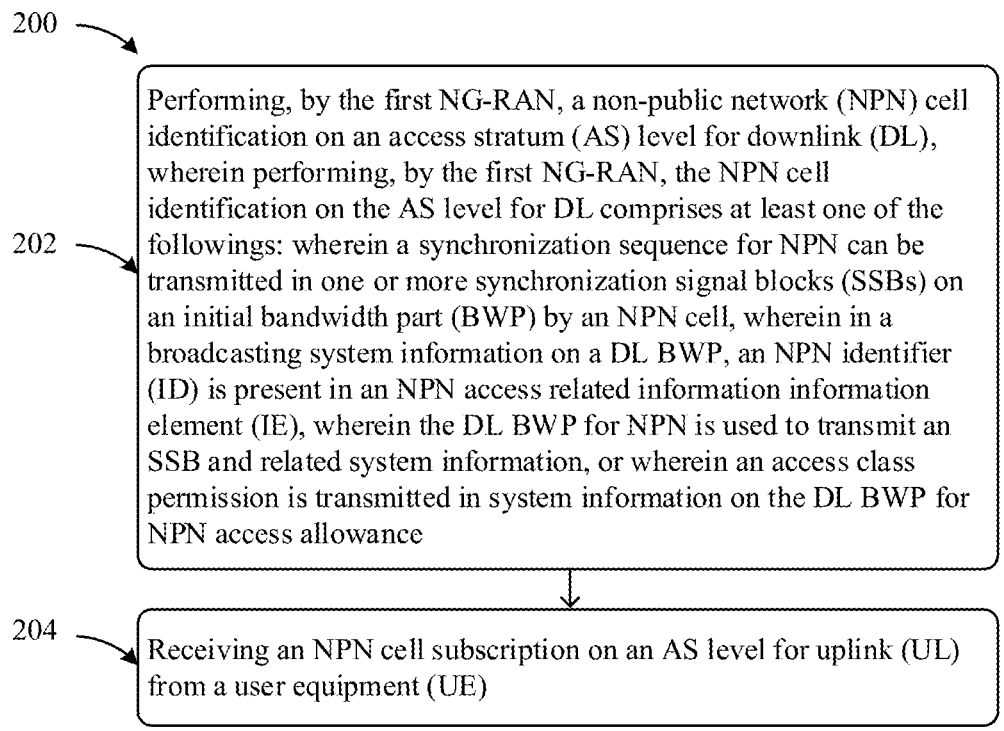
FIG. 2 is a flowchart illustrating a method of wireless communication performed by a first NG-RAN according to an embodiment of the present disclosure.

FIG. 2 illustrates a method 200 of wireless communication performed by a first NG-RAN according to an embodiment of the present disclosure. In some embodiments, the method 200 includes: a block 202, performing, by the first NG-RAN, a non-public network (NPN) cell identification on an access stratum (AS) level for downlink (DL), wherein performing, by the first NG-RAN, the NPN cell identification on the AS level for DL comprises at least one of the followings: wherein a synchronization sequence for NPN can be transmitted in one or more synchronization signal blocks (SSBs) on an initial bandwidth part (BWP) by an NPN cell, wherein in a broadcasting system information on a DL BWP, an NPN identifier (ID) is present in an NPN access related information information element (IE), wherein the DL BWP for NPN is used to transmit an SSB and related system information, or wherein an access class permission is transmitted in system information on the DL BWP for NPN access allowance. Further, the method 200 includes: a block 204, receiving an NPN cell subscription on an AS level for uplink (UL) from a user equipment (UE). This can solve issues in the prior art, provide an access stratum (AS) level cell/subscription identification, provide an efficient UE's mobility restriction exchange, provide a lower power consumption, provide a better resource management, provide a service continuity due to mobility, provide lower latency for non-public network membership identification, provide higher reliability for non-public network connection, and/or provide a good communication performance.

Figure 3:
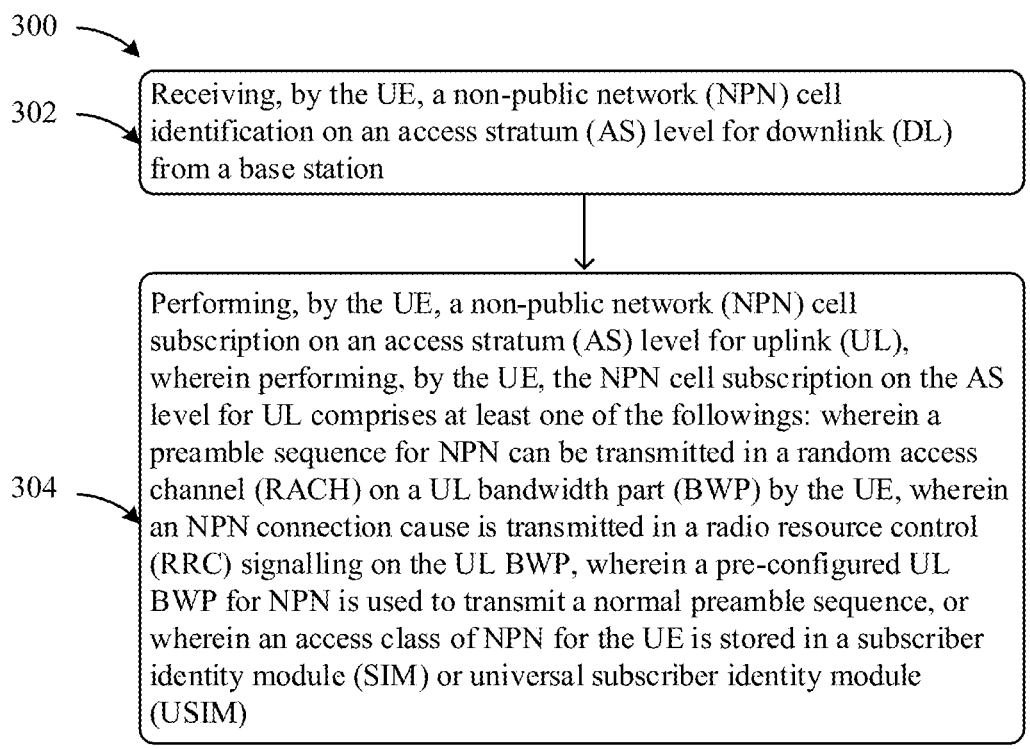
FIG. 3 is a flowchart illustrating a method of wireless communication performed by a UE according to an embodiment of the present disclosure.

FIG. 3 illustrates a method 300 of wireless communication performed by a UE according to an embodiment of the present disclosure. In some embodiments, the method 300 includes: a block 302, receiving, by the UE, a non-public network (NPN) cell identification on an access stratum (AS) level for downlink (DL) from a base station, and a block 304, performing, by the UE, a non-public network (NPN) cell subscription on an access stratum (AS) level for uplink (UL), wherein performing, by the UE, the NPN cell subscription on the AS level for UL comprises at least one of the followings: wherein a preamble sequence for NPN can be transmitted in a random access channel (RACH) on a UL bandwidth part (BWP) by the UE, wherein an NPN connection cause is transmitted in a radio resource control (RRC) signalling on the UL BWP, wherein a pre-configured UL BWP for NPN is used to transmit a normal preamble sequence, or wherein an access class of NPN for the UE is stored in a subscriber identity module (SIM) or universal subscriber identity module (USIM). This can solve issues in the prior art, provide an access stratum (AS) level cell/subscription identification, provide an efficient UE's mobility restriction exchange, provide a lower power consumption, provide a better resource management, provide a service continuity due to mobility, provide lower latency for non-public network membership identification, provide higher reliability for non-public network connection, and/or provide a good communication performance.

In some embodiments, the method further comprises receiving an NPN cell subscription on an AS level for uplink (UL) from a user equipment (UE). In some embodiments, the system information comprises the NPN access related information IE, and the NPN access related information IE is a system information block 1 (SIB1). In some embodiments, the system information further comprises a cell usage IE. In some embodiments, at least one of the NPN access related information IE and the cell usage IE comprises 1 bit indication for NPN access permission. In some embodiments, a cell selection and/or re-selection is determined by detecting a setting of the NPN access related information IE and/or the cell usage IE to true.

In some embodiments, a non-public network (NPN) (also called a non-public network) is a physical or virtual cellular system that has been deployed for private use by subscribers. An NPN is the term used by 3rd generation partnership project (3GPP) for such networks. An NPN is a 5G system (5GS) and is deployed as two following types: a standalone non-public network (SNPN) and a public network integrated non-public network (PNI-NPN). The SNPN is operated by an NPN operator and not relying on network functions provided by a public land mobile network (PLMN). The combination of a PLMN identifier (ID) and a network identifier (NID) identifies an SNPN. Optionally a human-readable network name per NID can be used for manual NPN selection. The PNI-NPN is integrated with a support of a PLMN. The combination of a PLMN ID and a closed access group identifier (CAG ID) identifies an PNI-NPN. Optionally a human-readable network name per CAG ID can be used for manual NPN selection.

In some embodiments, to facilitate a network (re)attachment, a UE can perform measurements for cell (re)selection purposes. There are some mechanisms which allow an NPN cell to impose cell identifications on an AS level: 1, A pre-configured synchronization sequence for NPN can be transmitted in SSB(s) on an initial bandwidth part (BWP) by an NPN cell. 2. In a broadcasting system information (e.g., SIB1) on a downlink (DL) BWP, an NPN ID is present in an NPN access related information IE (e.g., npn-IdentityInfoList, onboardingAllowed) and optionally a cell usage IE (e.g., reservedForOtherUse, reservedForOperatorUse) is set to TRUE. When a cell usage IE is set to TRUE, it means that the cell is only applicable to NPN subscribers for normal service. 3. A pre-configured DL BWP for NPN is used to transmit a normal SSB and related system information. 4. An access class permission is transmitted in system information on a DL BWP for NPN access allowance.

In some embodiments, the UE can indicate a selected NPN ID and a corresponding PLMN ID to an NG-RAN. The NG-RAN can inform an AMF of the selected NPN ID and PLMN ID. The AMF is responsible to verify whether the UE is a member of the NPN. It would be helpful if a NPN membership is checked initially by RAN nodes and then used by the AMF for verification. In the case of CAG, there is no requirement for CAG ID to be included in an RRC connection setup. There are some mechanisms to reveal UE's NPN subscription by the AS level: 1. A pre-authorized or a pre-configured preamble sequence for NPN can be transmitted in an RACH channel on a UL BWP by the UE. The RAN node firstly checks a specific preamble to identify an NPN-capable UE and configures a suitable measurement configuration for the NPN-capable UE. 2. An NPN connection cause is transmitted in an RRC signalling (e.g., RRC-SetupRequest, RRCResumeRequest) on a UL BWP. The RAN node firstly checks the establishment cause in accordance with an NPN information received from upper layers to identify the NPN-capable UE and configures a suitable measurement configuration for the NPN-capable UE. 3. A pre-configured UL BWP for NPN is used to transmit a normal preamble sequence. A DL BWP for NPN is paired with the pre-configured UL BWP during RACH. When the RAN node receives the specific preamble to identify the NPN-capable UE and then replies the RACH response on the paired DL NPN BWP. The UE scans the paired DL NPN BWP as cell (re)selection candidate. 4. An access class of NPN for a UE is stored in a subscriber identity module (SIM) or universal subscriber identity module (USIM), such as an USIM-like module (e.g., UE SIM card). When the received access class permission in system information on a DL BWP is match to the stored access class for NPN access allowance, the UE attempts to select an NPN cell.

In some embodiments, based on the above NPN subscription identification, RAN nodes and UEs can identify for NPN operation rapidly. No matter when an AMF notifies the verification result to the RAN node, the RAN node could configure a suitable measurement configuration for the NPN-capable UE. Moreover, if a mobility restriction is received in advance (i.e., before UE handover) from the AMF, the RAN node can configure a more suitable measurement configuration based on the above NPN subscription identification. It would be beneficial to save UE's resource (e.g., battery power) and to facilitate mobility (e.g., handover, tracking area update (TAU), dual connection, etc.). Here note that the mobility restriction contains an allowed CAG/NID list and an optional CAG-only indication. The allowed CAG/NID list is a list of CAG/NID identifiers that the UE can be allowed to access. The RAN node can configure the allowed CAG/NID list to the UE for measurement and cell (re)selection. The CAG-only indication indicates whether the UE is only allowed to access 5GS via CAG cells. When the CAG-only indication is set to true, the RAN node can only configure the CAG cells to the UE for measurement and cell (re)selection.

Figure 4:
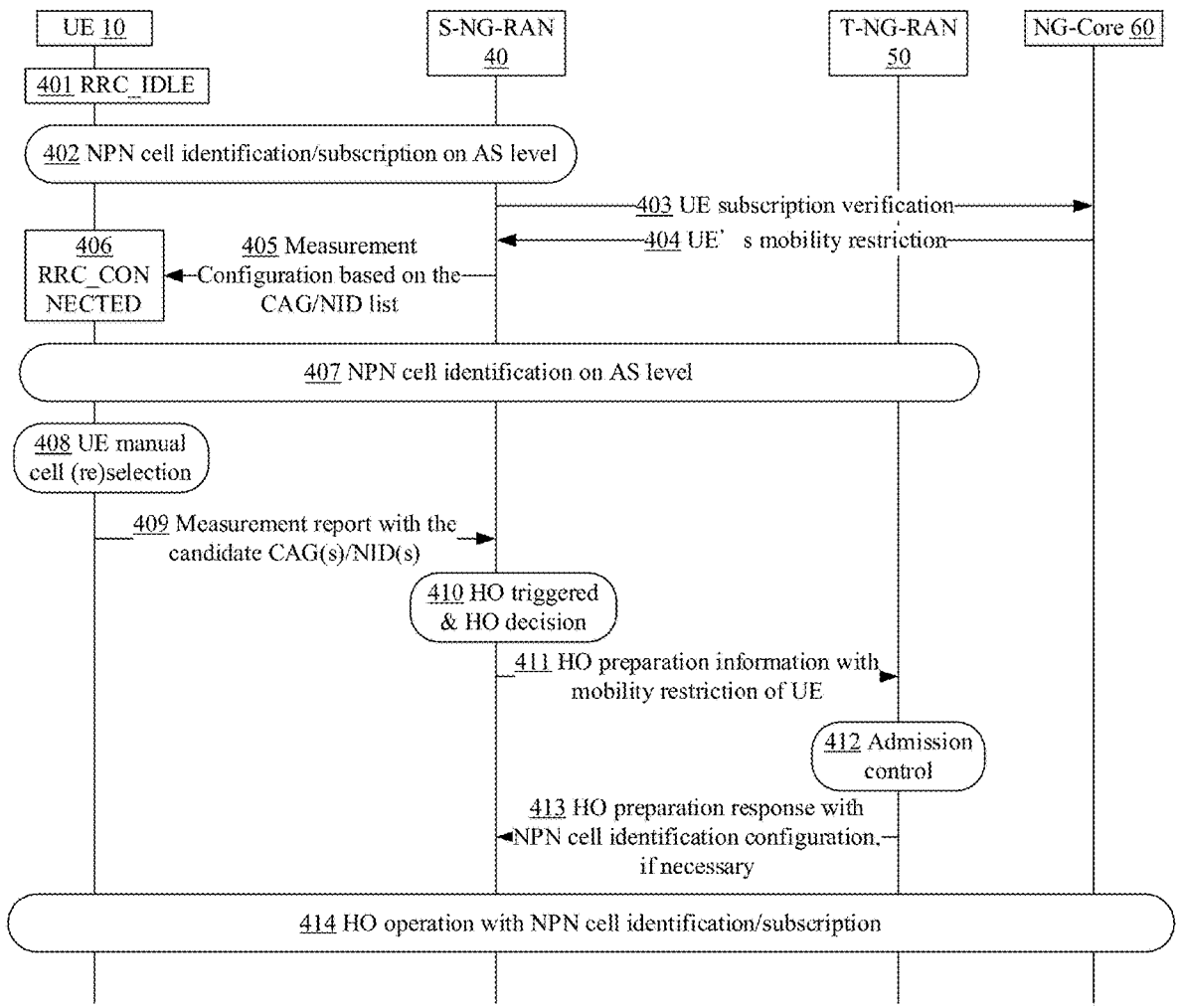
FIG. 4 is a schematic diagram illustrating a cell identification in a non-public network according to an embodiment of the present disclosure.

FIG. 4 illustrates that, in some embodiments, a cell identification in a non-public network is performed by UE 10, S-NG-RAN 40, T-NG-RAN 50, and NG-Core 60. At the cell identification in the non-public network includes least one of following operations: 401 RRC_IDLE, 402 NPN cell identification/subscription on AS level, 403 UE subscription verification, 404 UE's mobility restriction, 405 Measurement Configuration based on the CAG/NID list, 406 RRC_CONNECTED, 407 NPN cell identification on AS level, 408 UE manual cell (re) selection, 409 Measurement report with the candidate CAG(s)/NID(s), 410 HO triggered & HO decision, 411 HO preparation information with mobility restriction of UE, 412 Admission control, 413 HO preparation response with NPN cell identification configuration, if necessary, or 414 HO operation with NPN cell identification/subscription.

FIG. 4 illustrates a cell identification in a non-public network according to an embodiment of the present disclosure. FIG. 4 illustrates that, in some embodiments, in case of SNPN or PNI-NPN, a dynamic usage of available resources can enable a variety of services with the best coverage. As illustrated in FIG. 4, an NPN-capable UE is configured to camp either on an SNPN cell or a PNI-NPN cell based on the above proposed cell identification mechanism. A NPN membership can be firstly checked by a serving RAN node based on the above proposed subscription identification mechanism and then used by an NG-Core (e.g., AMF) for verification. Based on the above proposed NPN cell/subscription identification, the serving RAN node and the NPN-capable UE can identify for NPN operation rapidly. No matter when the NG-Core notifies a verification result to the RAN, the serving RAN node could configure a suitable measurement configuration with a pre-configured NPN cell list for the NPN-capable UE. This would be beneficial for use cases with a fast cell reselection in low power consumption. Moreover, if a mobility restriction is received in advance (i.e., before measurement) from the NG-Core, the serving RAN node can configure a more suitable measurement configuration with the received NPN cell lists. The measurement configuration can be more reflect characteristics of the requested service via a faster NPN subscription identification.

The NPN-capable UE supporting ultra-reliable and low-latency communication can monitor configured neighbor cells based on the above proposed NPN cell identification frequently. The optional UE manual cell reselection is very attractive to the NPN-capable UE as an ultra-reliable low-latency communications (URLLC) scenario. For UE manual cell (re)selection, if the best cell according to (re)selection priority rules is an NPN cell which is in the pre-configured NPN cell list but not in the allowed NPN cell lists, the NPN-capable UE cannot consider this cell as candidate for cell reselection but can continue to consider other cells on the same frequency for cell reselection. If the RAN node does not receive any mobility restriction from the NG-Core due to core network (CN) overload or some other reasons, the NPN-capable UE can consider this cell as candidate for cell reselection firstly and then the serving RAN node checks a status of the NG-Core later. For the other case of UE manual cell (re)selection, if the best cell according to (re)selection priority rules is an NPN cell which is in the allowed NPN cell lists but not in the pre-configured NPN cell list, the NPN-capable UE can consider this cell as candidate for cell reselection. The NPN-capable UE reports the candidate NPN cell(s) together with HRNN (if broadcast) for a serving RAN node handover triggering and decision. The inter-node messages exchange is performed between a serving RAN node and target RAN node. Handover preparation information (e.g., HandoverPreparationInformation) with a mobility restriction of a UE and a handover command (e.g., HandoverCommand) with the proposed NPN cell identification may be transmitted for handover preparation phase. The network-based handover operation with the proposed NPN cell/subscription identification can apply for an NPN-capable UE leaving the serving NPN cell in an RRC_CONNECTED state.

FIG. 4 illustrates that, in some embodiments, the cell reselection for network-based intra-Core handover (HO) in an NPN. The serving RAN node and the target RAN node can be one of a normal cell, a CAG cell, and an SNPN cell. It is reasonable that an SNPN-only-capable UE is only allowed to move between SNPN cells. The PNI-NPN-only-capable UE is only allowed to move between CAG cells. The cell reselection for network-based inter-Core HO in NPN are the similar as those described in the aforesaid embodiment and, hence, are not repeated. The difference is the serving NG-Core may transmit the UE's mobility restriction to the target NG-Core (not shown). Furthermore, if the target NG-Core has the UE's mobility restriction before the reception from the serving NG-Core, the target NG-Core may choose one of these depends on the preference.

Figure 5:
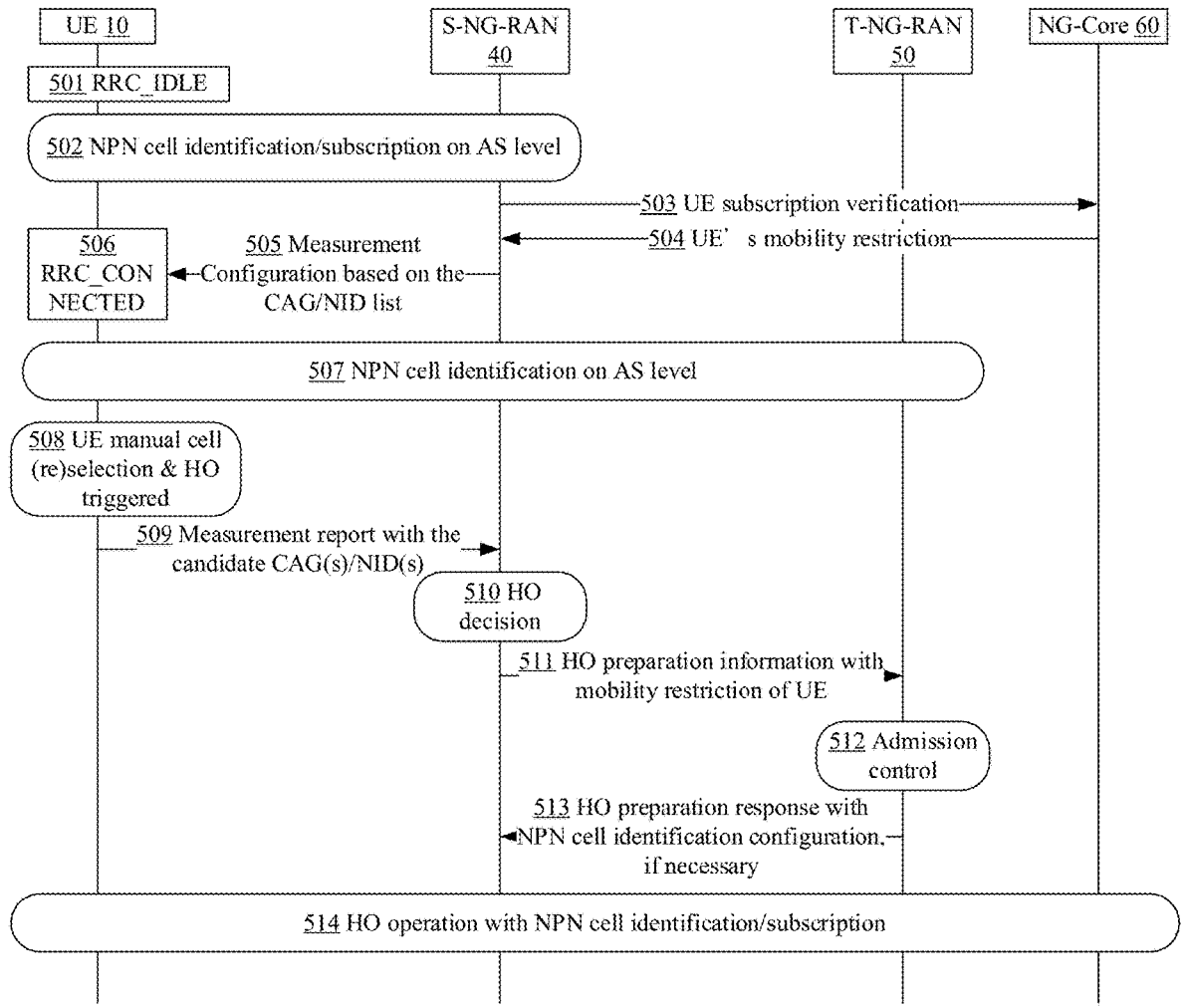
FIG. 5 is a schematic diagram illustrating a cell identification in a non-public network according to an embodiment of the present disclosure.

FIG. 5 illustrates that, in some embodiments, a cell identification in a non-public network is performed by UE 10, S-NG-RAN 40, T-NG-RAN 50, and NG-Core 60. At the cell identification in the non-public network includes least one of following operations: 501 RRC_IDLE, 502 NPN cell identification/subscription on AS level, 503 UE subscription verification, 504 UE's mobility restriction, 505 Measurement Configuration based on the CAG/NID list, 506 RRC_CONNECTED, 507 NPN cell identification on AS level, 508 UE manual cell (re) selection & HO triggered, 509 Measurement report with the candidate CAG(s)/NID(s), 510 HO decision, 511 HO preparation information with mobility restriction of UE, 512 Admission control, 513 HO preparation response with NPN cell identification configuration, if necessary, or 514 HO operation with NPN cell identification/subscription.

FIG. 5 illustrates a cell identification in a non-public network according to an embodiment of the present disclosure. FIG. 5 illustrates that, in some embodiments, in case of SNPN or PNI-NPN, a dynamic usage of available resources will enable a variety of services with the best coverage. As illustrated in FIG. 5, an NPN-capable UE is configured to camp either on an SNPN cell or a PNI-NPN cell based on the above proposed cell identification mechanism. An NPN membership can be firstly checked by a serving RAN node based on the above proposed subscription identification mechanism and then used by an NG-Core (e.g., AMF) for verification. Based on the above proposed NPN cell/subscription identification, the serving RAN node and the NPN-capable UE can identify for NPN operation rapidly. No matter when the NG-Core notifies the RAN with the verification result, the serving RAN node could configure a suitable measurement configuration with the pre-configured NPN cell list for the NPN-capable UE. This would be beneficial for use cases with a fast cell reselection in low power consumption.

Moreover, if a mobility restriction is received in advance (i.e., before measurement) from the NG-Core, the serving RAN node can configure a more suitable measurement configuration with the received NPN cell lists. The measurement configuration can be more reflect the characteristics of the requested service via the faster NPN subscription identification. The NPN-capable UE supporting ultra-reliable and low-latency communication can monitor the configured neighbor cells based on the above proposed NPN cell identification frequently. The UE manual cell reselection is very attractive to the NPN-capable UE as a URLLC scenario. For UE manual cell (re)selection, if the best cell according to (re)selection priority rules is an NPN cell which is in the pre-configured NPN cell list but not in the allowed NPN cell lists, the NPN-capable UE cannot consider this cell as candidate for cell reselection but can continue to consider other cells on the same frequency for cell reselection. If the RAN node does not receive any mobility restriction from the NG-Core due to core network (CN) overload or some other reasons, the NPN-capable UE can consider this cell as candidate for cell reselection firstly and then the serving RAN node checks the status of NG-Core later.

For the other case of UE manual cell (re)selection, if the best cell according to (re)selection priority rules is an NPN cell which is in the allowed NPN cell lists but not in the pre-configured NPN cell list, the NPN-capable UE can consider this cell as candidate for cell reselection. The NPN-capable UE triggers a HO procedure and reports the selected target NPN cell together with the HRNN (if broadcast) to the serving RAN node for HO decision. The inter-node messages exchange is performed between the serving RAN node and the target RAN node.

Handover preparation information (e.g., HandoverPreparationInformation) with a mobility restriction of the UE and a handover command (e.g., HandoverCommand) with the proposed NPN cell identification may be transmitted for handover preparation phase. The UE-based handover operation with the proposed NPN cell/subscription identification can apply for an NPN-capable UE leaving the serving NPN cell in an RRC_CONNECTED state. FIG. 5 illustrated that, in some embodiments, the cell reselection for UE-based intra-Core HO in NPN. The serving and target RAN nodes can be one of normal, CAG, SNPN cells. It is reasonable that an SNPN-only-capable UE is only allowed to move between SNPN cells. The PNI-NPN-only-capable UE is only allowed to move between CAG cells. The cell reselection for UE-based inter-Core HO in NPN are the similar as those described in the aforesaid embodiment and, hence, are not repeated. The difference is the serving NG-Core may transmit UE's mobility restriction to the target NG-Core (not shown). Furthermore, if the target NG-Core has the UE's mobility restriction before the reception from serving NG-Core, the target NG-Core may choose one of these depends on the preference.

Figure 6:
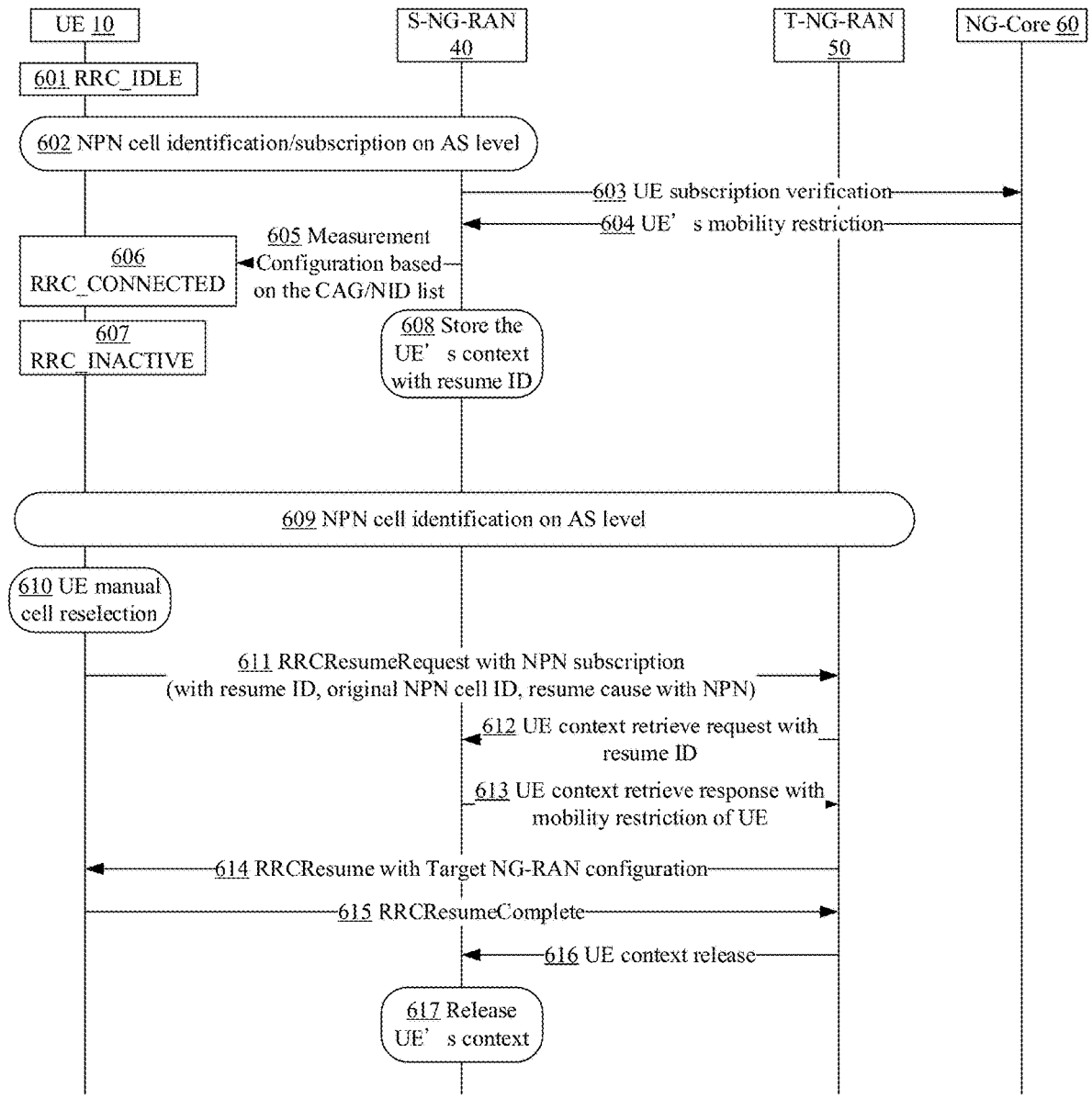
FIG. 6 is a schematic diagram illustrating a cell identification in a non-public network according to an embodiment of the present disclosure.

FIG. 6 illustrates that, in some embodiments, a cell identification in a non-public network is performed by UE 10, S-NG-RAN 40, T-NG-RAN 50, and NG-Core 60. At the cell identification in the non-public network includes least one of following operations: 601 RRC_IDLE, 602 NPN cell identification/subscription on AS level, 603 UE subscription verification, 604 UE's mobility restriction, 605 Measurement Configuration based on the CAG/NID list, 606 RRC_CONNECTED, 607 RRC_INACTIVE, 608 Store the UE's context with resume ID, 609 NPN cell identification on AS level, 610 UE manual cell reselection, 611 RRCResumeRequest with NPN subscription (with resume ID, original NPN cell ID, resume cause with NPN), 612 UE context retrieve request with resume ID, 613 UE context retrieve response with mobility restriction of UE, 614 RRCResume with Target NG-RAN configuration, 615 RRCResumeComplete, 616 UE context release, or 617 Release UE's context.

FIG. 6 illustrates a cell identification in a non-public network according to an embodiment of the present disclosure. FIG. 6 illustrates that, in some embodiments, in case of SNPN or PNI-NPN, the dynamic usage of available resources can enable a variety of services with the best coverage. As shown in FIG. 6, the NPN-capable UE is configured to camp either on SNPN or PNI-NPN cell based on the above proposed cell identification mechanism. The NPN membership can be firstly checked by an original RAN node based on the above proposed subscription identification mechanism and then used by the NG-Core (e.g., AMF) for verification. Based on the above proposed NPN cell/subscription identification, the original RAN node and the NPN-capable UE can identify for NPN operation rapidly. No matter when the NG-Core notifies the RAN with the verification result, the original RAN node could configure a suitable measurement configuration with the pre-configured NPN cell list for the NPN-capable UE. This would be beneficial for use cases with a fast cell reselection in low power consumption.

Moreover, if the mobility restriction is received in advance (i.e., before measurement) from the NG-Core, the serving RAN node can configure a more suitable measurement configuration with the received NPN cell lists. The measurement configuration can be more reflect the characteristics of the requested service via the faster NPN subscription identification. The NPN-capable UE in an RRC_INACTIVE state supporting ultra-reliable and low-latency communication can monitor the configured neighbor cells based on the above proposed NPN cell identification frequently. The UE manual cell reselection is very attractive to the NPN-capable UE as a URLLC scenario. For UE manual cell (re)selection, if the best cell according to (re)selection priority rules is an NPN cell which is in the pre-configured NPN cell list but not in the allowed NPN cell lists, the NPN-capable UE cannot consider this cell as candidate for cell reselection but can continue to consider other cells on the same frequency for cell reselection. If the RAN node does not receive any mobility restriction from the NG-Core due to CN overload or some other reasons, the NPN-capable UE can consider this cell as candidate for cell reselection firstly and then the original RAN node checks the status of NG-Core later.

For the other case of UE manual cell (re)selection, if the best cell according to (re)selection priority rules is an NPN cell which is in the allowed NPN cell lists but not in the pre-configured NPN cell list, the NPN-capable UE can consider this cell as candidate for cell reselection. The NPN-capable UE in the RRC_INACTIVE state transmits connection resumption request (e.g., RRCResume) with resume ID, original NPN cell ID, resume cause, etc. The resume cause is used to indicate the NPN access and therefore enable seamless connection resumption for low-latency communication networks. The inter-node message exchange is performed between original and new RAN nodes according to at least one of the followings: 1. A UE context retrieve request (e.g., RETRIEVE UE CONTEXT REQUEST) with a resume ID is used to require a UE context. 2. A UE context retrieve response (e.g., RETRIEVE UE CONTEXT RESPONSE) with a UE context and a mobility restriction. Here the original RAN node may transmit the UE's mobility restriction to the new RAN node. Furthermore, if the new RAN node has the UE's mobility restriction before the reception from the original RAN node, the new RAN node may choose one of these depends on the preference. 3. A UE context release (e.g., UE CONTEXT RELEASE) is used to inform the original RAN node with the UE context release.

In some embodiments, the connection resumption with the proposed NPN cell/subscription identification can apply for an NPN-capable UE in the RRC_INACTIVE state. FIG. 6 illustrates that, in some embodiments, the cell reselection for intra-Core connection resumption in NPN. The original and new RAN nodes can be one of the normal, CAG, SNPN cells. It is reasonable that a SNPN-only-capable UE is only allowed to resume between SNPN cells. The PNI-NPN-only-capable UE is only allowed to resume between CAG cells. The cell reselection for inter-Core connection resumption in NPN are the similar as those described in the aforesaid embodiment and, hence, are not repeated. The difference is the original NG-Core may transmit UE's mobility restriction to the new NG-Core (not shown). Furthermore, if the new NG-Core has the UE's mobility restriction before the reception from original NG-Core, the new NG-Core may choose one of these depends on the preference.

Figure 7A:
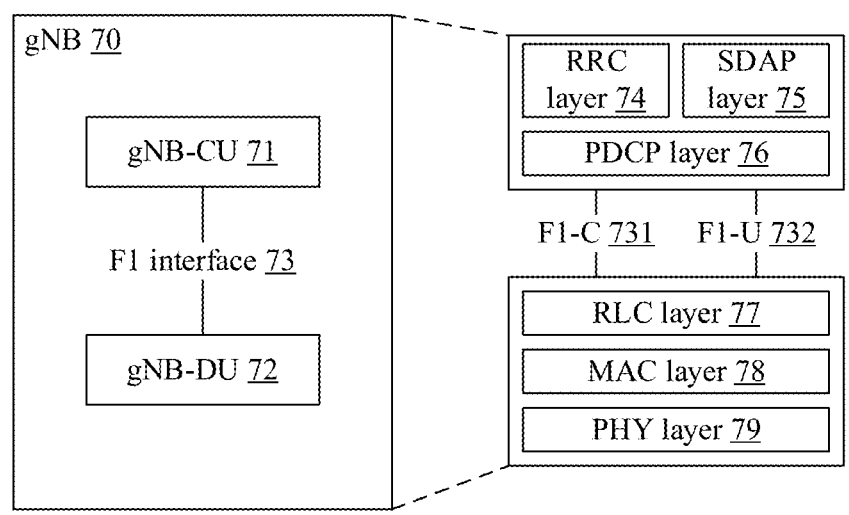
FIG. 7A is a schematic diagram illustrating a new radio mobile communication system according to an embodiment of the present disclosure.

FIG. 7A illustrates a new radio mobile communication system according to an embodiment of the present disclosure. FIG. 7A illustrates that, in some embodiments, a RAN functional split architecture allows for network coordination for loading management, ultra-reliable, and low-latency optimization, and enables network function virtualization/software defined network (NFV/SDN) applications. FIG. 7A illustrates that, in some embodiments, the new radio mobile communication system conforms to the specification of the fifth generation of mobile communication technology and comprises a NG-RAN (the NG-RAN may be referred to as a gNB) and/or a NG-Core (not shown). The gNB comprises a centralized unit (CU) and a distributed unit (DU). An F1 interface is individually established between the CU and DU, wherein the F1 interface is a logic interface defined in the specification of the fifth generation of mobile communication technology. In some embodiments, a protocol stack of the CU comprises an RRC layer, a SDAP layer, and a PDCP layer, while a protocol stack of the DU comprises an RLC layer, a MAC layer, and a PHY layer. The F1 interface between the CU and DU is established between the PDCP layer of the protocol stack and the RLC layer of the protocol stack. Within the scope of FIG. 7A, the illustrated components and their corresponding reference numerals are as follows. It is understandable that the following description merely illustrates the components shown in FIG. 7A and their corresponding reference numerals, without going beyond the scope disclosed in FIG. 7A. The gNB is designated by reference numeral 70, comprising a gNB-CU labeled as 71 and a gNB-DU labeled as 72. An F1 interface labeled as 73 is individually established between the gNB-CU 71 and the gNB-DU 72. The F1 interface 73 includes an F1-C interface 731 and an F1-U interface 732. Additionally, FIG. 7A shows that a protocol stack of the gNB-CU 71 comprises an RRC layer 74, a SDAP layer 75, and a PDCP layer 76, while a protocol stack of the @NB-DU 72 comprises an RLC layer 77, a MAC layer 78, and a PHY layer 79.

Figure 7B:
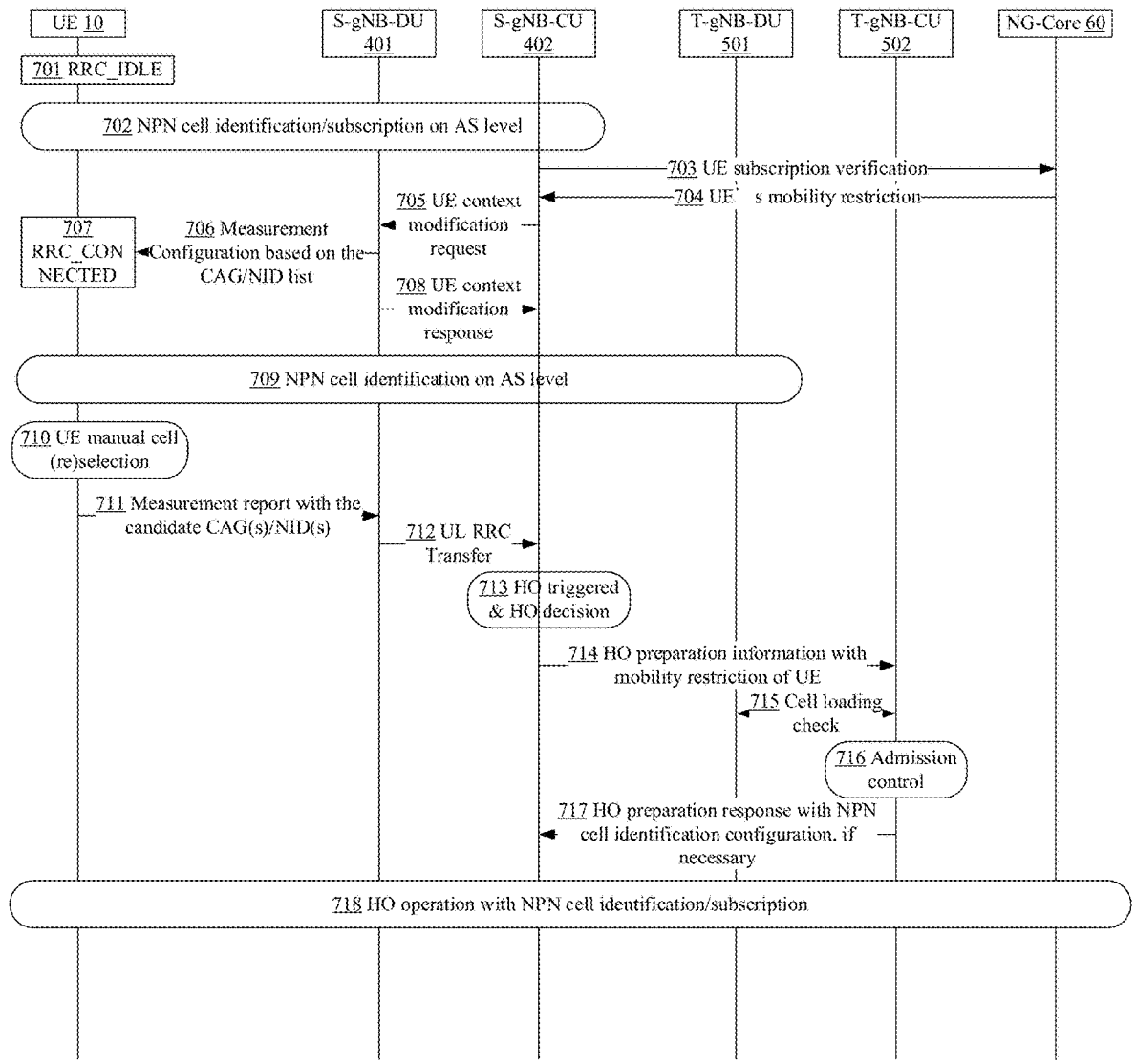
FIG. 7B is a schematic diagram illustrating a cell identification in a non-public network according to an embodiment of the present disclosure.

FIG. 7B illustrates that, in some embodiments, a cell identification in a non-public network is performed by UE 10, S-gNB-DU 401, S-gNB-CU 402, T-gNB-DU 501, T-gNB-CU 502, and NG-Core 60. At the cell identification in the non-public network includes least one of following operations: 701 RRC_IDLE, 702 NPN cell identification/subscription on AS level, 703 UE subscription verification, 704 UE's mobility restriction, 705 UE context modification request, 706 Measurement Configuration based on the CAG/NID list, 707 RRC_CONNECTED, 708 UE context modification response, 709 NPN cell identification on AS level, 710 UE manual cell (re) selection, 711 Measurement report with the candidate CAG(s)/NID(s), 712 UL RRC Transfer, 713 HO triggered & HO decision, 714 HO preparation information with mobility restriction of UE, 715 Cell loading check, 716 Admission control, 717 HO preparation response with NPN cell identification configuration, if necessary, or 718 HO operation with NPN cell identification/subscription.

In case of SNPN or PNI-NPN, the dynamic usage of available resources will enable a variety of services with the best coverage. As aforesaid embodiments, the NPN-capable UE is configured to camp either on SNPN or PNI-NPN cell with RAN functional split based on the above proposed cell/subscription identification mechanisms. At mobility and connection resumption, the cell reselection for Inter-gNB-CU via Xn (i.e., intra-Core HO, intra-Core connection resumption) and Inter-gNB-CU via NG (i.e., inter-Core HO, inter-Core connection resumption) are the similar as those described in the aforesaid embodiments and, hence, are not repeated. The difference is the F1 signalling transmissions. Takes network-based Inter-gNB-CU HO via Xn case as example, in FIG. 7A and FIG. 7B, a UE context modification request/response is responsible to measurement configuration transmission while an uplink RRC transfer carrying measurement report between a serving gNB-DU and a serving gNB-CU. The handover preparation information (e.g., HandoverPreparationInformation) with the UE's mobility restriction is transmitted from the serving gNB-CU to the target gNB-CU. Furthermore, if the target gNB-CU has the UE's mobility restriction before the reception from the serving gNB-CU, the target gNB-CU may choose one of these depends on the preference. After cell loading check between the target gNB-CU and the gNB-DU (e.g., UE context setup request/response), the handover command (e.g., HandoverCommand) is transmitted from the target gNB-CU to the serving gNB-CU. The CAG/NID lists may be transmitted over F1 message(s) for the sake of fast NPN cell/subscription identification during cell loading check procedure. The downlink RRC transfer may be used to carry DL RRC messages if necessary.

Figure 8:
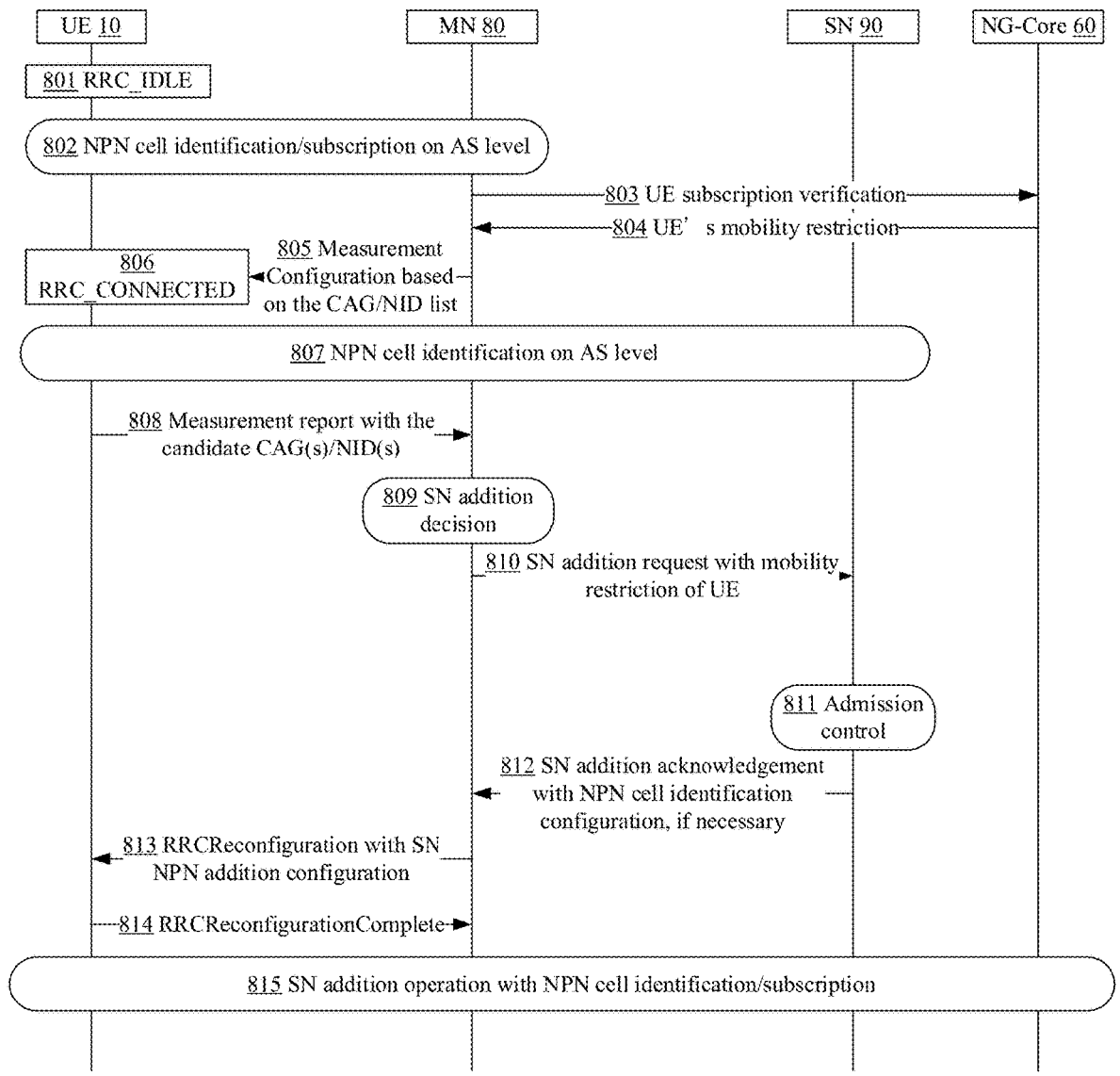
FIG. 8 is a schematic diagram illustrating a cell identification in a non-public network according to an embodiment of the present disclosure.

FIG. 8 illustrates that, in some embodiments, a cell identification in a non-public network is performed by UE 10, MN 80, SN 90, and NG-Core 60. At the cell identification in the non-public network includes least one of following operations: 801 RRC_IDLE, 802 NPN cell identification/subscription on AS level, 803 UE subscription verification, 804 UE's mobility restriction, 805 Measurement Configuration based on the CAG/NID list, 806 RRC_CONNECTED, 807 NPN cell identification on AS level, 808 Measurement report with the candidate CAG(s)/NID(s), 809 SN addition decision, 810 SN addition request with mobility restriction of UE, 811 Admission control, 812 SN addition acknowledgement with NPN cell identification configuration, if necessary, 813 RRCReconfiguration with SN NPN addition configuration, 814 RRCReconfigurationComplete, or 815 SN addition operation with NPN cell identification/subscription.

FIG. 8 illustrates a cell identification in a non-public network according to an embodiment of the present disclosure. FIG. 8 illustrates that, in some embodiments, in case of SNPN or PNI-NPN, the dynamic usage of available resources will enable a variety of services with the best coverage. As shown in FIG. 8, the NPN-capable UE is configured to camp either on SNPN or PNI-NPN cell based on the above proposed cell identification mechanism. The NPN membership can be firstly checked by a master node (MN) based on the above proposed subscription identification mechanism and then used by the NG-Core (e.g., AMF) for verification. Based on the above proposed NPN cell/subscription identification, the MN and the NPN-capable UE can identify for NPN operation rapidly. No matter when the NG-Core notifies the RAN rode with the verification result, the MN could configure a suitable measurement configuration with the pre-configured NPN cell list for the NPN-capable UE. This would be beneficial for use cases with a fast NR multi-connection establishment in low power consumption. Moreover, if the mobility restriction is received in advance (i.e., before measurement) from the NG-Core, the MN can configure a more suitable measurement configuration with the received NPN cell lists. The measurement configuration can be more reflect the characteristics of the requested service via the faster NPN subscription identification.

The NPN-capable UE supporting ultra-reliable and low-latency communication can monitor the configured neighbor cells based on the above proposed NPN cell identification frequently. The optional UE manual cell reselection is very attractive to the NPN-capable UE as a URLLC scenario. For UE manual cell (re)selection, if the best cell according to (re)selection priority rules is an NPN cell which is in the pre-configured NPN cell list but not in the allowed NPN cell lists, the NPN-capable UE cannot consider this cell as candidate for measurement report but can continue to consider other cells on the same frequency for cell selection. If the MN does not receive any mobility restriction from the NG-Core due to CN overload or some other reasons, the NPN-capable UE can consider this cell as candidate for measurement report firstly and then the MN checks the status of NG-Core later. For the other case of UE manual cell (re)selection, if the best cell according to (re)selection priority rules is a NPN cell which is in the allowed NPN cell lists but not in the pre-configured NPN cell list, the NPN-capable UE can consider this cell as candidate for measurement report. The NPN-capable UE reports the candidate NPN cell(s) together with the HRNN (if broadcast) for SN addition. The inter-node message exchange is performed between MN and SN nodes. SN addition request (e.g., CG-ConfigInfo) with mobility restriction of UE and SN Addition Request Acknowledge (e.g., CG-Config) with the proposed NPN cell identification may transmitted for SN addition. Upon the reception of SN addition request acknowledgement, the MN transmits RRC connection reconfiguration (e.g., RRCReconfiguration) with NPN cell ID for SN addition. Then the UE transmits RRC connection reconfiguration complete (e.g., RRCReconfigurationComplete) with optional SN NPN cell ID to NAS level. When the NPN SN addition is under the same PLMN, the SN NPN cell ID may not need to transmit to NAS level. Otherwise, the SN NPN cell ID is needed to transmit to NAS level even via MN, SN, or UE. The SN addition operation with the proposed NPN cell/subscription identification can apply for an NPN-capable UE establishing the NR multi-connection in RRC_CONNECTED state.

FIG. 8 illustrates that, in some embodiments, the cell selection for SN addition in NPN. The MN and SN nodes can be one of the normal, CAG, SNPN cells. It is reasonable that an SNPN-only-capable UE is only allowed to establish NR multi-connection between SNPN cells. The PNI-NPN-only-capable UE is only allowed to establish NR multi-connection between CAG cells. The SN addition for different PLMN in NPN are the similar as those described in the aforesaid embodiment and, hence, are not repeated. The difference is the serving PLMN may transmit the UE's mobility restriction to the target PLMN (not shown). Furthermore, if the target PLMN has the UE's mobility restriction before the reception from serving PLMN, the target PLMN may choose one of these depends on the preference. The above scenario would be benefited to RAN sharing.

Figure 9A:
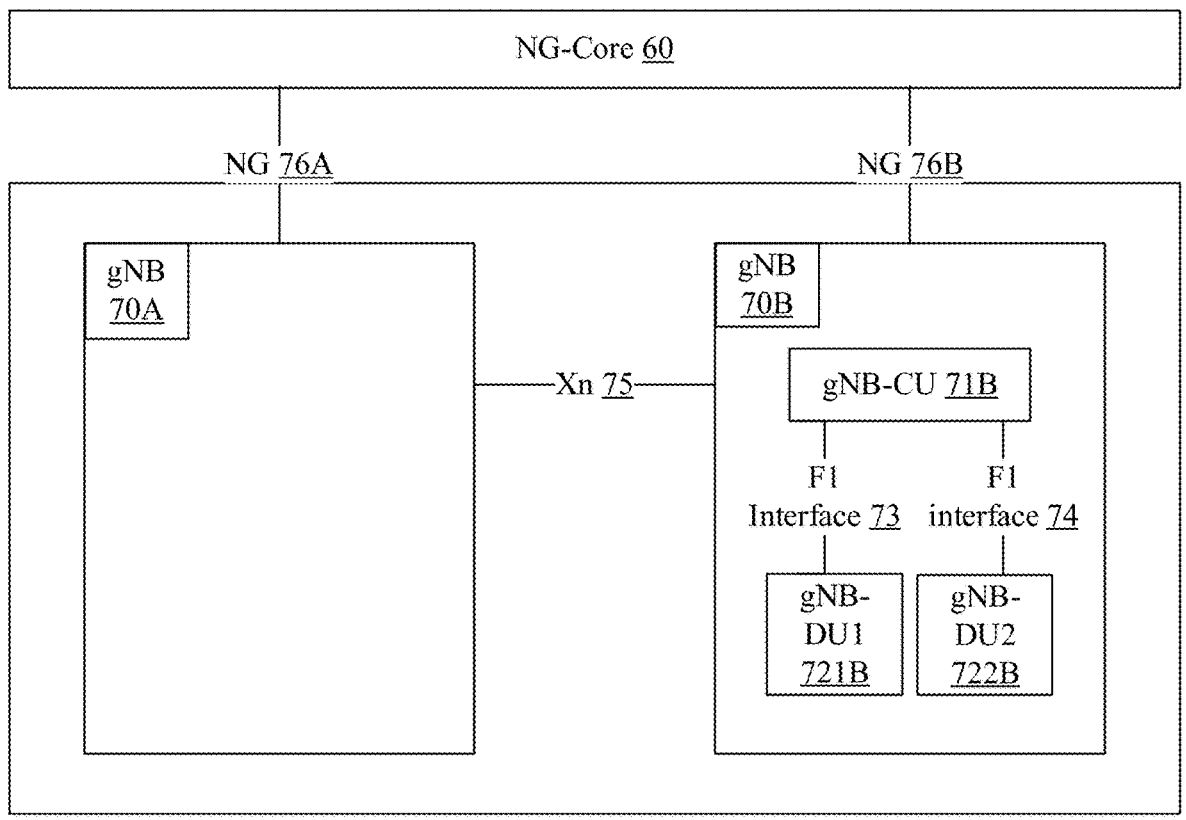
FIG. 9A is a schematic diagram illustrating a new radio mobile communication system according to an embodiment of the present disclosure.
Figure 9B:
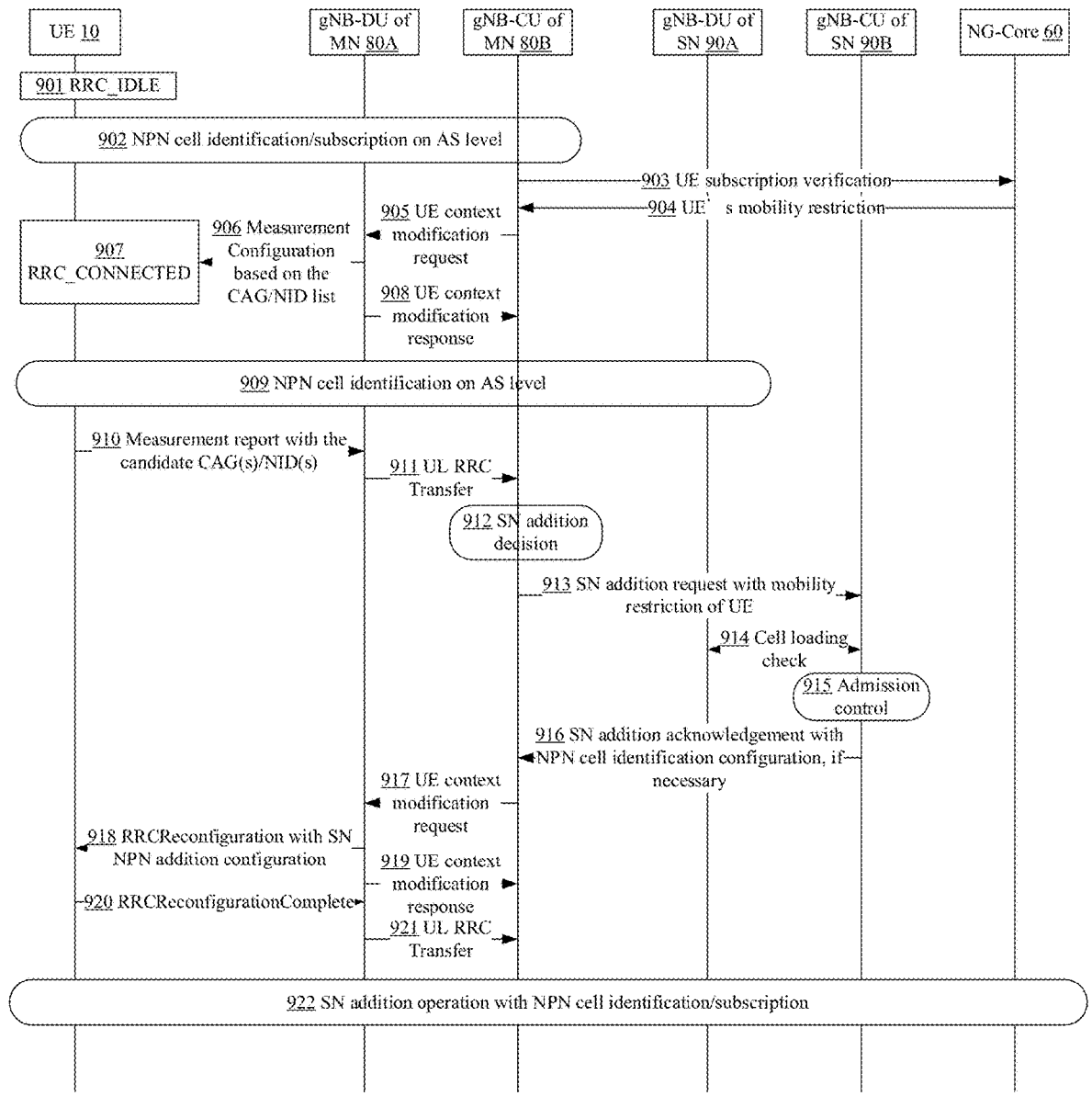
FIG. 9B is a schematic diagram illustrating a cell identification in a non-public network according to an embodiment of the present disclosure.

FIG. 9A illustrates a new radio mobile communication system according to an embodiment of the present disclosure. FIG. 9B illustrates a cell identification in a non-public network according to an embodiment of the present disclosure. FIG. 9A and FIG. 9B illustrate that, in some embodiments, a RAN functional split architecture allows for network coordination for loading management, ultra-reliable, and low-latency optimization, and enables NFV/SDN applications. In FIG. 9A, the new radio mobile communication system conforms to the specification of the fifth generation of mobile communication technology and comprises an NG-RAN (the NG-RAN may be referred to as a gNB) and/or a NG-Core (5GC). The gNB comprises a centralized unit (CU) and a plurality of distributed unit (DUs). An F1 interface is individually established between the CU and DUs, wherein the F1 interface is a logic interface defined in the specification of the fifth generation of mobile communication technology. In some embodiments, the protocol stack of CU comprises an RRC layer, a SDAP layer, and a PDCP layer, while the protocol stack of DU comprises an RLC layer, a MAC layer, and a PHY layer. The F1 interface between the CU and DU is established between the PDCP layer of the protocol stack and the RLC layer of the protocol stack. Within the scope of FIG. 9A, the illustrated components and their corresponding reference numerals are as follows. It is understandable that the following description merely illustrates the components shown in FIG. 9A. The new radio mobile communication system comprises two gNBs identified as 70A and 70B and/or a NG-Core labeled as 60. The gNB 70B includes gNB-CU labeled as 71B, gNB-DU1 labeled as 721B, and gNB-DU2 labeled as 722B. An F1 interface labeled as 73 is individually established between the gNB-CU 71B and the gNB-DU1 721B. An F1 interface labeled as 74 is individually established between the gNB-CU 71B and the gNB-DU2 722B. Xn interface labeled as 75 is established between gNB 70A and gNB 70B. Additionally, NG interface labeled as 76A is established between the NG-Core 60 and the gNB 70A. NG interface labeled as 76B is established between the NG-Core 60 and the gNB 70B.

FIG. 9B illustrates that, in some embodiments, a cell identification in a non-public network is performed by UE 10, gNB-DU of MN 80A, gNB-CU of MN 80B, gNB-DU of SN 90A, gNB-CU of SN 90B, and NG-Core 60. At the cell identification in the non-public network includes least one of following operations: 901 RRC_IDLE, 902 NPN cell identification/subscription on AS level, 903 UE subscription verification, 904 UE's mobility restriction, 905 UE context modification request, 906 Measurement Configuration based on the CAG/NID list, 907 RRC_CONNECTED, 908 UE context modification response, 909 NPN cell identification on AS level, 910 Measurement report with the candidate CAG(s)/NID(s), 911 UL RRC Transfer, 912 SN addition decision, 913 SN addition request with mobility restriction of UE, 914 Cell loading check, 915 Admission control, 916 SN addition acknowledgement with NPN cell identification configuration, if necessary, 917 UE context modification request, 918 RRCReconfiguration with SN NPN addition configuration, 919 UE context modification response, 920 RRCReconfigurationComplete, 921 UL RRC Transfer, or 922 SN addition operation with NPN cell identification/subscription.

In case of SNPN or PNI-NPN, the dynamic usage of available resources will enable a variety of services with the best coverage. As descripted in the above embodiment, the NPN-capable UE is configured to camp either on SNPN or PNI-NPN cell with RAN functional split based on the above proposed cell/subscription identification mechanisms. From RAN point of view, the NPN SN addition procedure is the similar as those described in the above embodiment and, hence, are not repeated. The difference is the F1 signalling transmissions. In FIG. 9B, a UE context modification request/response is responsible to a measurement configuration and an NPN SN addition transmission while an uplink RRC transfer carrying measurement report between the gNB-DU and the gNB-CU of the MN. The SN addition request (e.g., CG-ConfigInfo) with the UE's mobility restriction is transmitted from the gNB-CU of the MN to the gNB-CU of the SN. Furthermore, if the gNB-CU of the SN has the UE's mobility restriction before the reception from the gNB-CU of the MN, the gNB-CU of the SN may choose one of these depends on the preference. After cell loading check between the gNB-CU and the gNB-DU of the SN (e.g., UE context setup request/response), the SN addition request acknowledge (e.g., CG-Config) with the NPN cell identification is transmitted from the gNB-CU of the SN to the gNB-CU of the MN. The CAG/NID lists may be transmitted over F1 message(s) for the sake of fast NPN cell/subscription identification during cell loading check procedure. The downlink RRC transfer may be used to carry DL RRC messages if necessary.

Figure 10:
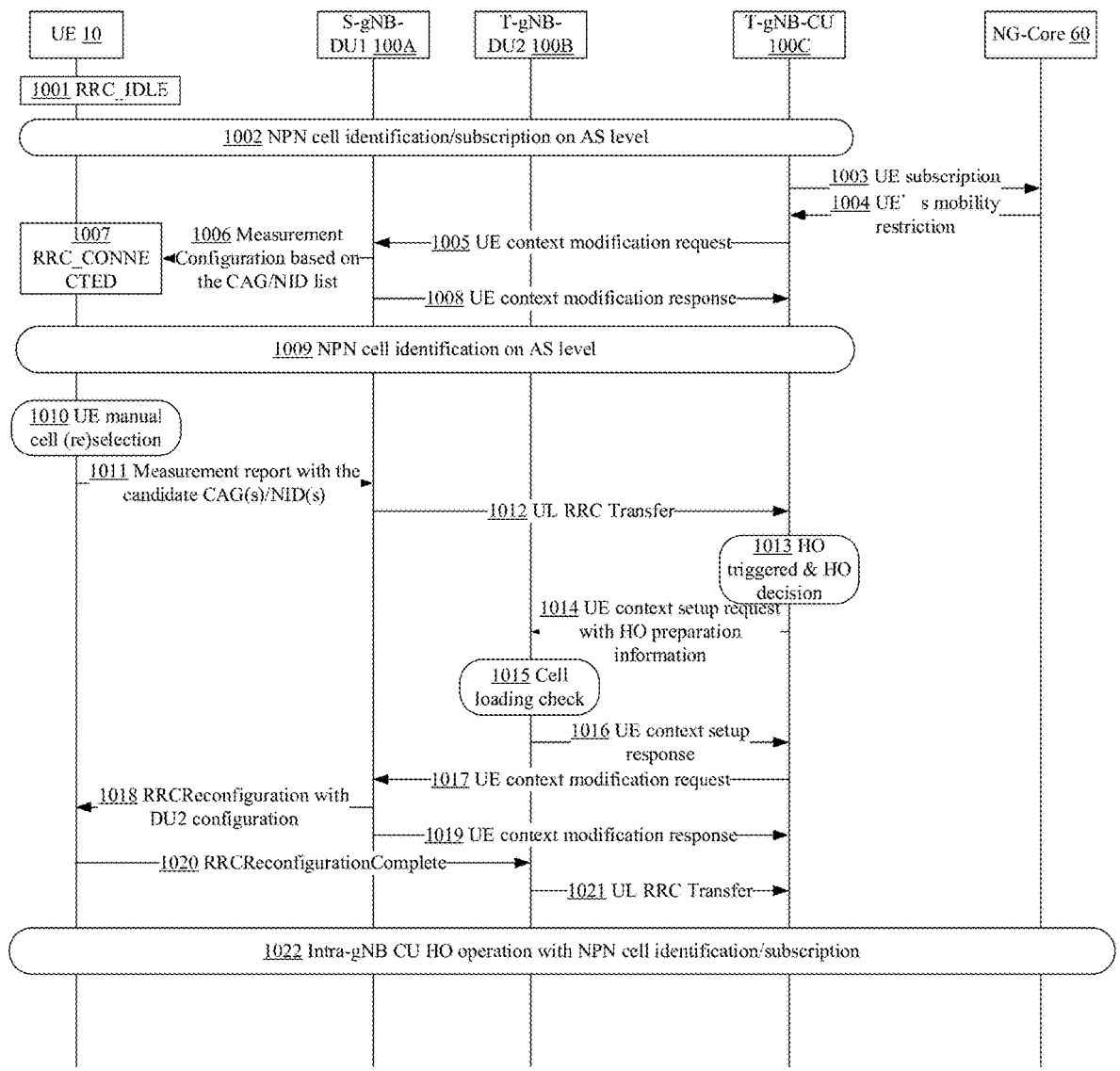
FIG. 10 is a schematic diagram illustrating a cell identification in a non-public network according to an embodiment of the present disclosure.

FIG. 10 illustrates a cell identification in a non-public network according to an embodiment of the present disclosure. FIG. 10 illustrates that, in some embodiments, an RAN functional split architecture allows for network coordination for loading management, ultra-reliable and low-latency optimization, and enables NFV/SDN applications. In FIG. 9A, the new radio mobile communication system conforms to the specification of the fifth generation of mobile communication technology and comprises a NG-RAN (the NG-RAN may be referred to as a gNB) and/or a NG-Core (5GC).

The gNB comprises a centralized unit (CU) and a plurality of distributed unit (DUs, e.g., DU1 and DU2). An F1 interface is individually established between the CU and DUs, wherein the F1 interface is a logic interface defined in the specification of the fifth generation of mobile communication technology. In some embodiments, the protocol stack of the CU comprises an RRC layer, a SDAP layer, and a PDCP layer, while the protocol stack of the DU comprises an RLC layer, a MAC layer, and a PHY layer. The F1 interface between the CU and DU is established between the PDCP layer of the protocol stack and the RLC layer of the protocol stack. In case of SNPN or PNI-NPN, the dynamic usage of available resources will enable a variety of services with the best coverage. As aforesaid embodiments, the NPN-capable UE is configured to camp either on SNPN or PNI-NPN cell with RAN functional split based on the above proposed cell/subscription identification mechanisms. In intra-gNB-DU inter-cell mobility via F1 and inter-gNB-DU mobility via F1 cases (i.e., intra-gNB-CU HO), the cell reselection is the similar as those described in the aforesaid embodiments and, hence, are not repeated. The difference is the F1 signalling transmissions.

In FIG. 10, a UE context modification request/response is responsible to a measurement configuration and an RRC connection reconfiguration transmission while an uplink RRC transfer carrying measurement report and an RRC connection reconfiguration complete between a serving gNB-DU1 and a serving gNB-CU. The UE context setup request with a UE's mobility restriction is transmitted from the serving gNB-CU to a target gNB-DU2. The UE context setup response is transmitted from the target gNB-DU2 to the serving gNB-CU. The CAG/NID lists may be transmitted over F1 message(s) for the sake of fast NPN cell/subscription identification during HO procedure. The downlink RRC transfer may be used to carry DL RRC messages if necessary. Upon the reception of the UE context setup response, the serving gNB-CU transmits a UE context modification request carrying RRC connection reconfiguration (e.g., RRCReconfiguration) with an NPN cell ID for HO. Then, the UE transmits an RRC connection reconfiguration complete (e.g., RRCReconfigurationComplete) with an optional SN NPN cell ID to an NAS level in an UL RRC transfer. The intra-gNB-CU HO operation with the proposed NPN cell/subscription identification can apply for an NPN-capable UE seamless switching the DU-connection in RRC_CONNECTED state. FIG. 10 illustrates that, in some embodiments, the cell reselection for intra-gNB-CU HO in NPN. The gNB-DU1 and the gNB-DU2 can be one of the normal, CAG, SNPN cells. It is reasonable that an SNPN-only-capable UE is only allowed to move between SNPN cells. The PNI-NPN-only-capable UE is only allowed to move between CAG cells. The inter-PLMN with multiple DU-connection switching in an NPN are the similar as those described in the aforesaid embodiment and, hence, are not repeated. The difference is the gNB-CU of the serving PLMN may transmit a UE's mobility restriction to the gNB-CU of the target PLMN (not shown). Furthermore, if the gNB-CU of the target PLMN has the UE's mobility restriction before the reception from the gNB-CU of the serving PLMN, the gNB-CU of the target PLMN may choose one of these depends on the preference. The above scenario would be benefited to RAN sharing. Within the scope of FIG. 10, the illustrated components and their corresponding reference numerals are as follows. It is understandable that the following description merely illustrates the components shown in FIG. 10. FIG. 10 illustrates that, in some embodiments, a cell identification in a non-public network is performed by at least one of UE 10, S-gNB-DU1 100A, T-gNB-DU2 100B, T-gNB-CU 100C, and NG-Core 60. The cell reselection for intra-gNB-CU HO in NPN includes at least one of following operations: 1001 RRC_IDLE, 1002 NPN cell identification/subscription on AS level, 1003 UE subscription verification, 1004 UE's mobility restriction, 1005 UE context modification request, 1006 Measurement Configuration based on the CAG/NID list, 1007 RRC_CONNECTED, 1008 UE context modification response, 1009 NPN cell identification on AS level, 1010 UE manual cell (re) selection, 1011 Measurement report with the candidate CAG(s)/NID(s), 1012 UL RRC Transfer, 1013 HO triggered & HO decision, 1014 UE context setup request with HO preparation information, 1015 Cell loading check, 1016 UE context setup response, 1017 UE context modification request, 1018 RRCReconfiguration with DU2 configuration, 1019 UE context modification response, 1020 RRCReconfigurationComplete, 1021 UL RRC Transfer, or 1022 Intra-gNB CU HO operation with NPN cell identification/subscription.

Commercial interests for some embodiments are as follows. 1. Solving issues in the prior art. 2. Providing an access stratum (AS) level cell/subscription identification. 3. Providing an efficient UE's mobility restriction exchange, provide a lower power consumption. 4. Providing a better resource management. 5. Providing a service continuity due to mobility. 6. Providing lower latency for non-public network membership identification. 7. Providing higher reliability for non-public network connection. 8. Providing a good communication performance. 9. Some embodiments of the present disclosure are used by 5G-NR chipset vendors, V2X communication system development vendors, automakers including cars, trains, trucks, buses, bicycles, motobikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR licensed and non-licensed or shared spectrum communications. Some embodiments of the present disclosure propose technical mechanisms.

Figure 11:
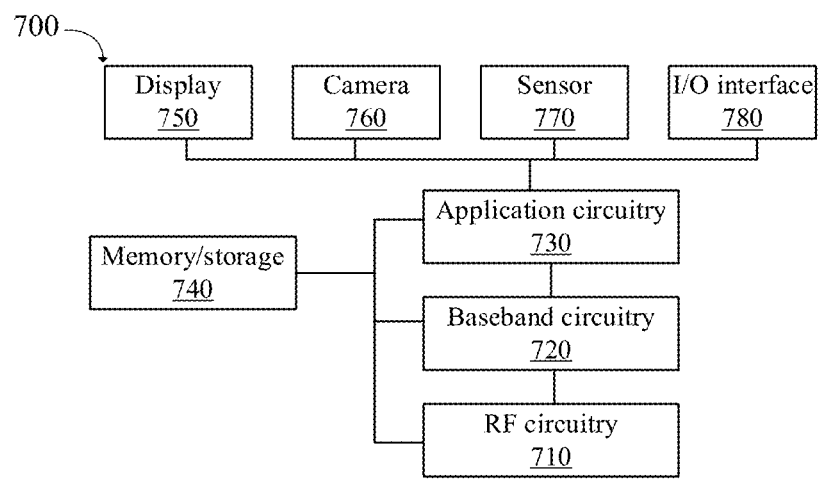
FIG. 11 is a block diagram of a system for wireless communication according to an embodiment of the present disclosure.

FIG. 11 is a block diagram of an example system 700 for wireless communication according to an embodiment of the present disclosure. Embodiments described herein may be implemented into the system using any suitably configured hardware and/or software. FIG. 11 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a first next generation radio access network (NG-RAN) for onboarding and provisioning in non-public network (NPN), comprising:
transmitting, by the first NG-RAN, an NPN cell identification imposed on an access stratum (AS) level to a user equipment (UE), wherein the NPN cell identification imposed on the AS level comprises at least one of the followings:
wherein a synchronization sequence for NPN is transmitted in one or more synchronization signal blocks (SSBs) on an initial bandwidth part (BWP) by an NPN cell;
wherein in a broadcasting system information on a downlink (DL) BWP, an NPN identifier (ID) is present in an NPN access related information, an information element, (IE) and an NPN access permission is present in a cell usage IE;
wherein the DL BWP for NPN is used to transmit an SSB and related system information; or
wherein an access class permission is transmitted in system information on the DL BWP for NPN access allowance.

2. The method of claim 1, wherein if the first NG-RAN receives a mobility restriction before a UE handover from an NG-Core, the first NG-RAN configures a measurement configuration based on the NPN cell subscription on the AS level for uplink (UL) to the UE.

3. The method of claim 1, further comprising controlling an NPN-capable UE to identify the NPN cell and configure a measurement configuration for an indicated NPN cell list according to an NPN cell identification and measurement configuration.

4. The method of claim 1, further comprising controlling an NPN-capable UE to camp either on a stand-alone non-public network (SNPN) cell or a public network integrated NPN (PNI-NPN) cell based on a UE manual cell selection and/or re-selection.

5. The method of claim 4, wherein for the UE manual cell selection and/or re-selection, when a best cell according to at least one of a selection priority rule and a re-selection priority rule is an NPN cell which is in a pre-configured NPN cell list and not in an allowed NPN cell list, the NPN-capable UE excludes the best cell as candidate for cell reselection and proceeds to evaluate another cell on the same frequency for cell reselection.

6. The method of claim 4, wherein for the UE manual cell selection and/or re-selection, when a best cell according to at least one of a selection priority rule and a re-selection priority rule is an NPN cell which is in an allowed NPN cell list and not in a pre-configured NPN cell list, the NPN-capable UE considers the best cell as candidate for cell reselection.

7. The method of claim 4, wherein when the UE is an SNPN-only-capable UE, the SNPN-only-capable UE moves between SNPN cells, and/or when the UE is a PNI-NPN-only-capable UE, the PNI-NPN-only-capable UE moves between closed access group (CAG) cells.

8. The method of claim 1, wherein an NPN membership is checked by one or more RAN nodes comprising the first NG-RAN and used by an NG-Core for verification.

9. The method of claim 1, wherein a cell selection and/or re-selection is determined by detecting a setting of the NPN access related information IE and/or the cell usage IE to true.

10. The method of claim 2, wherein the first NG-RAN controls an NPN-capable UE to report one or more candidate NPN cells and/or a human-readable network name (HRNN), and the first NG-RAN is configured to perform a handover triggering and decision according to the one or more candidate NPN cells and/or the HRNN.

11. The method of claim 10, wherein the first NG-RAN is configured to perform an inter-node message exchange, and the inter-node message exchange is performed between the first NG-RAN and a second NG-RAN.

12. The method of claim 10, wherein handover preparation information with a mobility restriction of the UE and a handover command with the NPN cell identification on the AS level for DL is transmitted for handover preparation phase.

13. The method of claim 10, wherein the first NG-RAN is configured to control the NPN-capable UE in a radio resource control (RRC)_INACTIVE state to transmit an RRC message with a resume ID, an original NPN cell ID, and/or a resume cause.

14. The method of claim 13, wherein a connection resumption with the NPN cell subscription on the AS level for UL applies for the NPN-capable UE in the RRC_INACTIVE state.

15. The method of claim 2, wherein the first NG-RAN used as a next generation node B (gNB) comprises a centralized unit (CU) and one or more distributed units (DUs), and an F1 interface is defined between the CU and the one or more DUs.

16. The method of claim 15, wherein at mobility and connection resumption, a cell reselection for inter-gNB centralized unit (gNB-CU) via a Xn interface and inter-gNB-CU via an NG interface is based on the NPN cell identification on the AS level for DL.

17. The method of claim 3, wherein the first NG-RAN is configured to control the NPN-capable UE to camp either on an SNPN cell or a PNI-NPN cell with an RAN functional split based on the NPN cell subscription on the AS level for UL.

18. The method of claim 17, wherein after a cell loading check procedure between a target gNB-CU and a target gNB-DU, a handover command is transmitted from the target gNB-CU to the serving gNB-CU.

19. The method of claim 18, wherein a CAG list and/or an NID list is transmitted over the F1 interface for the NPN cell subscription on the AS level for UL during the cell loading check procedure, and/or a downlink RRC transfer is used to carry a DL RRC message.

20. The method of claim 11, wherein an inter-node message exchange is performed between a master node (MN) and a secondary node (SN) used as a second NG-RAN.

21. The method of claim 20, wherein an SN addition request with a mobility restriction of the UE and an SN addition request acknowledge with the NPN cell identification on the AS level for DL is transmitted for SN addition.

22. The method of claim 20, wherein upon a reception of the SN addition request acknowledgement, the MN transmits an RRC connection reconfiguration with an NPN cell ID for SN addition.

23. The method of claim 22, wherein the MN is configured to control the UE to transmit an RRC connection reconfiguration complete with the NPN cell subscription and/or an SN NPN cell ID to a non-access stratum (NAS) level.

24. The method of claim 21, wherein the SN addition with the NPN cell identification on the AS level for DL applies for the NPN-capable UE establishing a new radio (NR) multi-connection in an RRC_CONNECTED state.

25. The method of claim 21, wherein the SN addition request with the mobility restriction of the UE is transmitted from the gNB-CU of the MN to a gNB-CU of the SN.

26. The method of claim 25, wherein an intra-gNB-CU handover operation with the NPN cell identification on the AS level for DL applies for the NPN-capable UE switching a DU-connection in an RRC_CONNECTED state, and/or an inter-PLMN with a switching of multiple DU-connections in an NPN is based on the NPN cell identification on the AS level for DL.

27. A first next generation radio access network (NG-RAN), comprising:
- a memory;
- a transceiver; and
- a processor coupled to the memory and the transceiver;
- wherein the transceiver is configured to transmit an NPN cell identification imposed on an access stratum (AS) level to a user equipment (UE), wherein the NPN cell identification imposed on the AS level comprises at least one of the followings:
- wherein a synchronization sequence for NPN is transmitted in one or more synchronization signal blocks (SSBs) on an initial bandwidth part (BWP) by an NPN cell;
- wherein in a broadcasting system information on a downlink (DL) BWP, an NPN identifier (ID) is present in an NPN access related information, an information element, (IE) and an NPN access permission is present in a cell usage IE;
- wherein the DL BWP for NPN is used to transmit an SSB and related system information; or
- wherein an access class permission is transmitted in system information on the DL BWP for NPN access allowance.

28. The first NG-RAN of claim 27, wherein the first NG-RAN used as a next generation node B (gNB) comprises a centralized unit (CU) and one or more distributed units (DUs), and an F1 interface is defined between the CU and the one or more DUs.

29. The first NG-RAN of claim 28, wherein at mobility and connection resumption, a cell reselection for inter-gNB centralized unit (gNB-CU) of the first NG-RAN via a Xn interface and inter-gNB-CU of the first NG-RAN via an NG interface is based on the NPN cell identification on the AS level for DL.

30. The first NG-RAN of claim 28, wherein after a cell loading check procedure between a target gNB-CU and a target gNB-DU of first NG-RAN, a handover command is transmitted from the target gNB-CU to the serving gNB-CU.

31. The first NG-RAN of claim 27, wherein an inter-node message exchange is performed between a master node (MN) used as the first NG-RAN and a secondary node (SN) used as a second NG-RAN.

32. The first NG-RAN of claim 31, wherein an SN addition request with a mobility restriction of the UE is transmitted from the gNB-CU of the MN to a gNB-CU of the SN.

33. The first NG-RAN of claim 32, wherein an intra-gNB-CU handover operation with the NPN cell identification on the AS level for DL applies for the NPN-capable UE switching a DU-connection in a radio resource control (RRC)_CONNECTED state, and/or an inter-PLMN with a switching of multiple DU-connections in an NPN is based on the NPN cell identification on the AS level for DL.

* * * * *